US006258917B1

(12) United States Patent  
Slagel

(10) Patent No.: US 6,258,917 B1
(45) Date of Patent: Jul. 10, 2001

(54) EXTRUDABLE THERMOPLASTIC ELASTOMERIC UREA-EXTENDED POLYURETHANE

(75) Inventor: Edwin C. Slagel, Avondale, AZ (US)

(73) Assignee: Simula, Inc., Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/157,588

(22) Filed: Sep. 21, 1998

Related U.S. Application Data

(63) Continuation-in-part of application No. 08/794,746, filed on Feb. 3, 1997, now Pat. No. 5,811,506.
(60) Provisional application No. 60/018,042, filed on May 21, 1996.

(51) Int. Cl.[7] .......................... C08G 18/32; C08G 18/10; C08G 18/48; C08G 18/75
(52) U.S. Cl. .......................... 528/64; 264/176.1; 528/61; 528/63; 528/76
(58) Field of Search .......................... 264/176.1; 528/61, 528/63, 64, 76

(56) References Cited

U.S. PATENT DOCUMENTS

| 2,830,037 | 4/1958 | Carter | 528/59 |
|---|---|---|---|
| 2,929,800 | 3/1960 | Hill | 525/403 |
| 2,929,804 | 3/1960 | Steuber | 528/61 |
| 2,999,839 | 9/1961 | Arvidson, Jr. et al. | 524/86 |
| 3,428,711 | 2/1969 | Hunt | 525/127 |
| 3,456,037 | 7/1969 | Hoeschele | 528/63 |
| 3,600,358 | 8/1971 | Taub | 528/64 |
| 3,718,624 | 2/1973 | Rustad | 528/64 |
| 3,766,148 * | 10/1973 | Taub | 528/64 |
| 3,789,032 * | 1/1974 | Hoeschele | 528/63 |
| 3,798,200 | 3/1974 | Kaneko et al. | 528/64 |
| 3,849,360 | 11/1974 | Farah et al. | 528/64 |
| 3,866,242 * | 2/1975 | Slagel | 528/64 |
| 3,932,360 | 1/1976 | Cerankowski et al. | 528/64 |
| 3,947,426 | 3/1976 | Lander | 528/45 |
| 3,963,681 | 6/1976 | Kaneko et al. | 528/61 |
| 4,062,834 | 12/1977 | Gilding et al. | 521/149 |
| 4,071,492 | 1/1978 | Bethea et al. | 524/774 |
| 4,088,627 | 5/1978 | Gergen et al. | 524/505 |
| 4,101,473 | 7/1978 | Lander | 528/45 |
| 4,106,313 | 8/1978 | Boe | 66/102 |
| 4,208,507 | 6/1980 | Stutz et al. | 528/64 |
| 4,374,210 | 2/1983 | Ewen et al. | 521/159 |
| 4,447,590 | 5/1984 | Szycher | 528/76 |
| 4,523,005 | 6/1985 | Szycher | 528/76 |
| 4,546,167 | 10/1985 | Chang | 528/64 |
| 4,762,884 | 8/1988 | Goyert et al. | 528/64 |
| 4,810,749 | 3/1989 | Pinchuk | 524/730 |
| 4,877,856 | 10/1989 | Hall et al. | 528/76 |
| 5,011,409 | 4/1991 | Gray | 433/136 |
| 5,066,761 * | 11/1991 | Miyazaki | 528/64 |
| 5,266,669 | 11/1993 | Onwunaka et al. | 528/67 |
| 5,393,858 | 2/1995 | Meijs et al. | 528/61 |
| 5,410,009 * | 4/1995 | Kato et al. | 528/64 |
| 5,811,506 * | 9/1998 | Slagel | 528/64 |

OTHER PUBLICATIONS

Oertel, Gunter; *Polyurethane Handbook;* 1985; Hanser Publishers; New York; pp. 36, 406.

* cited by examiner

*Primary Examiner*—Rabon Sergent
(74) *Attorney, Agent, or Firm*—Shaw Pittman

(57) ABSTRACT

An extrudable urea-extended thermoplastic polyurethane elastomer is formed from at least one aliphatic diisocyanate, at least one polyester glycol or polyether glycol, and at least one diamine curing agent. At least one second diamine curing agent and/or at least one extrusion processing aid may be included. The polyurethane has high-temperature-resistance and is thus extrudable at high temperatures. The polyurethane is also strong and durable. The polyurethane can be liquid-cast, transfer-molded, sprayed, and extruded without changing either the chemistry or stoichiometry of the polyurethane. The polyurethane may be used for making vehicle air bags or other any application for thermoplastic urethanes which requires increased thermal stability.

15 Claims, No Drawings

EXTRUDABLE THERMOPLASTIC ELASTOMERIC UREA-EXTENDED POLYURETHANE

The present application is a continuation-in-part of U.S patent application Ser. No. 08/794,746 filed on Feb. 3, 1997, now U.S. Pat. No. 5,811,506, which claims priority from U.S. Provisional Patent Application Ser. No. 60/018,042 filed May 21, 1996.

FIELD OF THE INVENTION

The present invention relates to an improved extrudable, thermoplastic, elastomeric polyurethane for use in efficiently manufacturing products such as air bags with excellent properties, and a process for making the same.

BACKGROUND OF THE INVENTION

Urethane elastomers are an important segment of the urethane industry. Urethane elastomers have many potential uses, including cast systems, adhesives, spray coatings, millable gums, and injection molding systems for commercial, automotive and military applications. However unsatisfactory thermal aging characteristics as well as poor hydrolysis and microbial resistance has limited the use of urethane elastomers particularly in applications which require the urethane product to undergo long term environmental exposure before or during its intended use. For example, new air bag technology demands a polyurethane elastomer which combines high-temperature resistance with excellent physical properties, processing parameters, and resistance to hydrolysis, oxygen, and ozone. In particular, for air bag use or any other related use, some of the most important properties are extrudability, high-temperature resistance, low temperature flex, high strength, elongation, low to moderate tensile modulus, good environmental resistance, excellent tear resistance, with an "A" durometer of about 80.

The extrudable urethane elastomers currently commercially available are typically hydroxyl-extended and do not have the thermal resistance necessary to resist the temperature of the gas generator during air bag deployment.

It is believed that there are currently no thermoplastic urethane elastomer compositions available that are urea-extended and that can be extruded with a combination of excellent temperature resistance, physical, and environmental properties. It has been believed in the art that a processable thermoplastic urethane could not be obtained using a diamine chain extender because the resulting urea segments gave the urethane a very high melting point. As such, the polyurethanes could not be processed by typical methods used in processing thermoplastic elastomeric materials, such as extrusion, without decomposition of the urethane.

Extrusion of thermoplastic polyurethane elastomers would be desirable to allow flexibility in the formation of various product shapes and sizes, including air bag bladders and the like. Extrusion also is a less expensive and faster processing method compared to other formation processes such as liquid casting.

Taub, U.S. Pat. No. 3,600,358, discloses a polyurethane elastomer prepared from a 4,4'-methylene bis(cyclohexylisocyanate), neopentyl adipate and aromatic diamine. Following addition of the aromatic diamine to the urethane prepolymer, the mixture is heated and poured into a mold for curing. Taub does not indicate that the urethane can be extruded. Taub also does not disclose or suggest the inclusion of a mixture of diamine materials to improve the extrudability of a urea-extended urethane.

Slagel, U.S. Pat. No. 3,866,242, discloses a protective shield comprising a polyurethane made from a polyester or polyether glycol, a diisocyanatodicyclohexylmethane isocyanate material, and a primary amine such as 4,4'-methylenebis(2-chloroaniline). The polyurethanes are cast between glass plates and cured to form the protective shield. The polyurethane disclosed by Slagel is not elastomeric, as evidenced by the disclosure that the material has a hardness on the "D" scale of 77–80 (col. 3, line 30). Slagel does not indicate that the polyurethane can be extruded. Slagel also does not disclose or suggest the inclusion of a mixture of diamine materials to improve the extrudability of a urea-extended urethane.

Accordingly, it is an object of the present invention to provide a thermoplastic polyurethane elastomer that is extrudable, that has high temperature resistance, and that is strong and durable for use in manufacturing urethane products such as air bags and the like. It is a further object of the present invention to provide a process for making such polyurethanes, as well as a process for extruding such polyurethanes.

Novel features of the invention, together with advantages thereof, will be better understood from the following descriptions in which embodiments of the invention are illustrated by way of examples.

SUMMARY OF THE INVENTION

Polyurethanes of the present invention comprise an extrudable reaction product of at least one aliphatic diisocyanate with at least one hydroxy-containing intermediate selected from polyester glycols, polyether glycols, and mixtures thereof, and at least one diamine curing agent. The polyurethanes may also include an extrusion processing aid. A process of the present invention comprises reacting at least one aliphatic diisocyanate with at least one hydroxy-containing intermediate to form a prepolymer, and then reacting the prepolymer with at least one diamine curing agent to form a thermoplastic polyurethane elastomer. Alternatively, at least one aliphatic diisocyanate may be reacted with less than one equivalent of the hydroxy-containing intermediate to form a prepolymer, and then the remaining equivalents of the hydroxy-containing intermediate may be added along with at least one diamine curing agent to form a cured elastomer. In addition, the present invention relates to a process of extruding polyurethanes of the invention, as well as extruded polyurethane products.

DETAILED DESCRIPTION OF PREFERRED EMBODIMENTS

Polyurethanes of the present invention comprise a reaction product of at least one aliphatic diisocyanate with at least one hydroxy-containing intermediate selected from polyester glycols, polyether glycols, and mixtures thereof, and at least one diamine curing agent. Preferably, the diamine curing agent system is a mixture of at least one first diamine curing agent and at least one second diamine curing agent. However, the polyurethane may be cured with only the at least one first diamine curing agent. At least one extrusion processing aid may also be included in the polyurethane. The polyurethanes of the present invention are thermoplastic elastomers that can be readily extruded into various urethane products.

The present polyurethanes are extrudable due to possessing an excellent melt flow property while at the same time having high thermal stability. Compared to commercially available thermoplastic urethane elastomers having a Shore A hardness of about 80, polyurethanes according to the invention having a similar Shore A hardness have a lower melt flow temperature on the order of 10 to 70° C. lower, when measured according to the ASTM D-1238 method. The melt flow index of the polyurethanes of the present invention ranges from about 5 to 40 inches per minute, more preferably from about 8 to 25 inches per minute, when measured in accordance with the modified ASTM D-1238 method described in Example 9. Thus, embodiments of the inventive polyurethanes are extrudable within the range of about 215° C. to 310° C., preferably about 235° C. to 260° C. Commercially available polyurethanes, on the other hand, liquify at such processing temperatures. Typically, commercially available polyurethanes, such as Pellethane (a hydroxyl-extended extrudable grade polyurethane commercially available from Dow), are extruded through a melt flow indexer at temperatures of about 224° C., using a load of 2 to 6 kg of pressure. Higher extrusion temperatures cannot be used because these commercially available polyurethanes destabilize and liquify at higher temperatures. The polyurethanes of the present invention, however, can be extruded at very high temperatures without degradation.

Without wishing to be bound by theory, the inventor believes that the present urea extended polyurethanes possess such superior properties and are extrudable due to the polyurethane including an aliphatic diisocyanate, preferably a saturated aliphatic diisocyanate. As such, the polyurethane exhibits thermoplastic properties and does not form any side reactions, e.g. does not form biurets, upon curing, unlike polyurethanes formed with aromatic diisocyanates. The polyurethanes thus may be cured to a solid product with excellent properties, but also may be re-melted and re-extruded due to the absence and/or low level of biurets.

Water included in the process of making the polyurethane can cause side reactions, thereby degrading the extrudability of the polyurethane formed. It is thus preferred that the polyurethane starting materials contain a low amount of water, if any. For example, the polyurethane is preferably made in an environment containing water in an amount no more than 0.03 weight percent by weight of the polyurethane materials.

In addition to the aliphatic diisocyanate, the present properties and extrudability are also believed to be realized in part by the use of diamine chain extending agents. The urea extensions in the polyurethane chain provide the polyurethanes with superior thermal stability, as discussed above, permitting extrusion at high temperatures.

Diamine Curing Agents

The diamine curing agents, or chain extenders, are preferably primary amines. Preferably, the at least one diamine curing agent is a mixture of two or more diamine curing agents. Preferably, a first diamine curing agent is an amine having a high thermal stability and capable of providing excellent melt flow properties to the polyurethane. Examples of first diamine curing agents include 2,4-diamino-3,5-diethyl-toluene and 2,6-diamino-3,5-diethyl-toluene (collectively diethylene toluenediamine (DETDA)), methylene dianiline (MDA), and mixtures thereof. For example, a preferred first curing agent used in the process of the present invention is diethylene toluenediamine (DETDA), which is sold by the Albemarle Corporation under the trade name Ethacure 100. This diamine curing agent is a liquid at room temperature. It has the following formula:

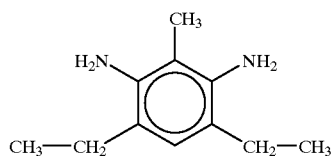

2, 5 ISOMER

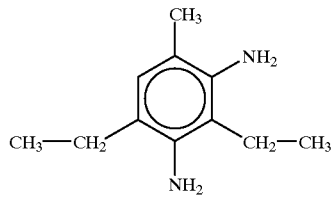

2, 4 ISOMER

Another preferred first diamine curing agent that may be used alone or in combination with other first diamine curing agents is methylene dianiline (MDA). MDA is available from Aldrich and has the following formula:

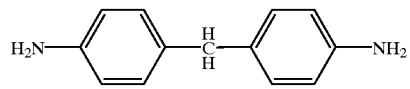

Although a good product is obtained using only the aforesaid first diamine curing agent(s), extrudability of the urethane polymer may be dramatically improved by adding a second diamine curing agent that acts as a reactive processing aid. For example, the second diamine curing agent may have the following formula:

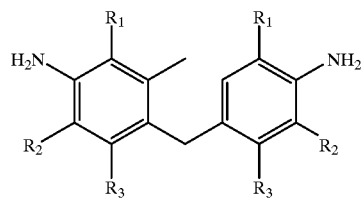

wherein $R_1$ and $R_2$ are each independently selected from methyl, ethyl, propyl, and isopropyl groups, and $R_3$ is selected from hydrogen and chlorine. Examples of these diamine curing agents include the following compounds manufactured by Lonza Ltd. (Basel, Switzerland):

LONZACURE® M-DIPA $R_1=C_3H_7$; $R_2=C_3H_7$; $R_3=H$
LONZACURE® M-DMA: $R_1=CH_3$; $R_2=CH_3$; $R_3=H$
LONZACURE® M-MEA: $R_1=CH_3$; $R_2=C_2H_5$; $R_3=H$
LONZACURE® M-DEA: $R_1=C_2H_5$; $R_2=C_2H_5$; $R_3=H$
LONZACURE® M-MIPA: $R_1=CH_3$; $R_2=C_3H_7$; $R_3=H$
LONZACURE® M-CDEA: $R_1=C_2H_5$; $R_2=C_2H_5$; $R_3=Cl$ wherein $R_1$, $R_2$ and $R_3$ refer to the above chemical formula. The chemical names of these materials are as follows: M-DIPA is 4,4'-methylene-bis(2,6-diisopropylaniline), M-DMA is 4,4'-methylene-bis(2,6-dimethylaniline), M-MEA is 4,4'-methylene-bis(2-ethyl-6-methylaniline), M-DEA is 4,4'-methylene-bis(2,6-diethylaniline), M-MIPA is 4,4'-methylene-bis(2-isopropyl-6-methylaniline), and M-CDEA is 4,4'-methylene-bis(2,6-diethyl-3-chloroaniline). Lonzacure® M-CDEA is available in the United States from Air Products and Chemicals, Inc.

(Allentown, Pa.). Particularly preferred second diamine curing agents are M-DIPA (methyl diisopropyl aniline) and M-DEA (methyl diethyl aniline).

Another diamine that may be used as a second diamine curing agent is trimethylene glycol di-para aminobenzoate, which is sold by Air Products and Chemicals, Inc. under the trade name Polacure 740M. It has the following formula:

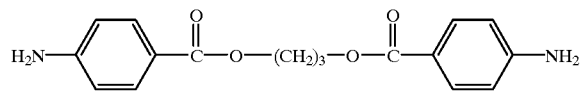

The second diamine curing agent is preferably added to the first curing agent in an amount of from, for example, 2 to 80 percent, based on equivalents, with a preferred range being 2 to 60 percent. A more preferred amount of the second diamine curing agent is 10 to 50 percent by equivalents. The first diamine curing agent is present in an amount of, for example, 20 to 98 percent by equivalents, preferably 40 to 98 percent, and more preferably 50 to 90 percent by equivalents.

A preferred diamine curing agent system is a combination of DETDA and either M-DIPA or M-DEA. Preferably, DETDA comprises 70 to 100 weight percent, more preferably 80 to 90 weight percent, and most preferably about 85 percent by weight of the total weight of the diamine curing agent system. The M-DEA or M-DIPA, with M-DEA being most preferred, is preferably present in an amount of 5 to 30 percent, more preferably 10 to 20 percent, and most preferably 15 percent by weight of the total weight of the diamine curing agents.

Aliphatic Diisocyanates

The aliphatic diisocyanates have the basic formula O=C=N—A—N=C=O, wherein A is a straight, branched and/or cyclic aliphatic group having, for example, 6 to 13 carbon atoms. The aliphatic diisocyanates are preferably saturated diisocyanates.

A preferred aliphatic diisocyanate for use in the process of the present invention is 4,4'-dicyclohexylmethane diisocyanate. Three isomers of 4,4'-dicyclohexylmethane diisocyanate are shown below:

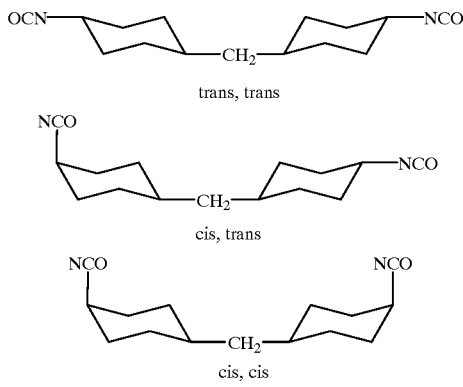

An example of such a diisocyanate is Desmodur W, a commercially available product of the Bayer Corporation. Desmodur W contains 20 percent of the trans, trans isomer of 4,4'-dicyclohexyl-methane diisocyanate, with the remaining 80 percent comprising the cis, trans and cis, cis isomers of 4,4'-dicyclohexyl-methane diisocyanate. XP-7041E, also available from the Bayer Corporation, contains 50 percent of the trans, trans isomer of 4,4'-dicyclohexylmethane diisocyanate, with the remaining 50 percent comprising the cis, trans and cis, cis isomers of 4,4'-dicyclohexyl-methane diisocyanate. Increasing the trans, trans isomer content from 20 to 50 percent improves the thermal properties and chemical resistance of the system with some degree of improvement in physical properties. Increasing the trans, trans isomer content to above 80 percent further improves the thermal stability and chemical resistance of the system with excellent physical properties and processing parameters.

Additional aliphatic diisocyanates that may be used include the following: First, 3-isocyanato-methyl-3,5,5-trimethylcyclohexyl isocyanate, which is available from Huls and has the following structural formula:

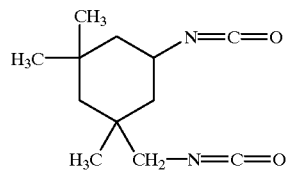

Second, tetramethylxylene diisocyanate (either meta or para), which is available from Cytex and has the following structural formula:

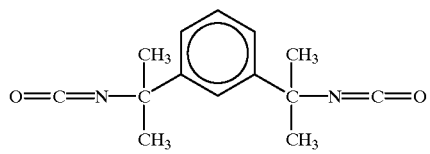

Hydroxy-Containing Intermediates

The hydroxy-containing intermediates which can be used in the process of the invention are preferably polyester glycols and polyether glycols having a weight average molecular weight of, for example, about 500 to about 3000.

Polyester glycols that are useful in the present invention preferably have a weight average molecular weight of, for example, about 1250 to about 2000 and include polycaprolactones and polyesters based on esterification of aliphatic dicarboxylic acids of 2 to 12 carbon atoms, such as adipic, succinic, and sebacic acids, in the presence of aliphatic glycols having preferably 2 to 12 carbon atoms, such as ethylene glycol, propylene glycol, diethylene glycol, 1,4-butanediol, neopentyl glycol, 1,6-hexanediol, 1,10-decanediol, and 1,12-dodecanediol.

Suitable polycaprolactones may preferably be prepared by the addition reaction of E-caprolactone in the presence of aliphatic glycols having preferably 2 to 12 carbon atoms such as ethylene glycol, propylene glycol, diethylene glycol, 1,4-butanediol, neopentyl glycol, 1,6-hexanediol, 1,10-decanediol, and 1,12-dodecanediol. The resulting polycaprolactone has the following formula:

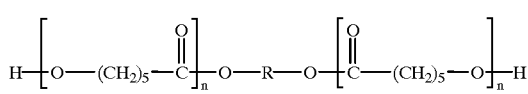

where $R=(CH_2)_{2-12}$ and n is selected such that the average molecular weight of the prepolymer is within the preferred range of about 500 to 3,000, with an exemplary average molecular weight being about 1,900.

Polyesters of dicarboxylic acids and glycols can be prepared by esterification or transesterification procedures that are well known in the art.

Polyether glycols that are useful in the present invention preferably have a weight average molecular weight of, for example, about 1000 to about 3000 and include poly-1,2-propylene ether glycol, poly-1,3-propylene ether glycol, and polytetramethylene ether glycol (PTMEG). These polyether glycols may be prepared by condensing epoxides or other cyclic ethers according to procedures that are well known in the art.

Preferred hydroxy-containing intermediates for use in the process of the invention are polycaprolactones, especially the polycaprolactones prepared by the addition reaction of E-caprolactone in the presence of neopentyl glycol, 1,4-butanediol, 1,6-hexanediol, 1,10-decanediol, or 1,12-dodecanediol. The most preferred polycaprolactones are neopentyl glycol-initiated polycaprolactones.

Reaction Process

In the preferred method, the aliphatic diisocyanate is first mixed with at least one hydroxy-containing intermediate in an equivalent ratio of, for example, about two NCO groups, to one OH group. The mixture is then heated, for example at a temperature of 82° C. to 127° C. (180° F. to 260° F.), more preferably 93° C. to 115° C. (200° F. to 240° F.), for about 10 to 60 minutes, more preferably 30 to 45 minutes to form a prepolymer. The prepolymer is then reacted with a diamine curing agent at a temperature of about 71° C. to 107° C. (160° F. to 225° F.) for about 4 to 20 hours to form the cured elastomer. The diamine curing agent is preferably added to the prepolymer in an equivalent ratio of, for example, 0.95–1.06 $NH_2$ groups to 1.0 NCO group, with the range of 0.98–1.0 $NH_2$ groups to 1.0 NCO group being most preferred.

Alternatively, the aliphatic diisocyanate may be reacted with 0.3 to 0.8 equivalents of the hydroxy-containing intermediate to form a prepolymer, and then the remaining 0.2 to 0.8 equivalents of the hydroxy-containing intermediate are added with the diamine curing agent to form the cured elastomer.

The cured elastomer is then granulated and/or pelletized prior to extrusion of the final product.

Antiblocking agents/extrusion processing aids, such as for example N,N'-ethylene bisstearamides (Acrawax C) or N,N'-dioleoylethylenediamine (Glycolube VL), both available from Lonza Specialty Chemicals, may optionally be added to improve processing characteristics and minimize or eliminate blocking of the extrusion. Levels ranging from, for example, 0.25% to 2.0% by weight may be added during the manufacture of the thermoplastic polyurethane. Testing has shown that excellent anti-blocking of the extrudate takes place with the addition of 0.5% to 1.0% by weight of Glycolube VL with no change in the physical properties of the system. The above anti-blocking agents Acrawax C or Glycolube VL are preferably used in conjunction with flux-calcined diatomaceous earth, available from the Celite Corporation. The diatomaceous earth may also be used alone as the antiblocking agent/extrusion processing aid. The diatomaceous earth may be added in amounts ranging from, for example, 2.0 to 4.0% by weight to give excellent results. These antiblocking agents/extrusion processing aids are added in the form of a concentrate to either the granulated elastomer or during pelletizing. While the addition of diatomaceous earth does improve the processability of the polyurethanes, it can cause the moisture levels in the polyurethanes to increase, which can lead to undesirable effects such as hydrolysis and swelling of the polymer.

The resulting extrudable urea-extended polyurethanes combine excellent thermal properties with excellent physical properties at an "A" durometer of approximately 80.

The polyurethanes of the present invention may be extruded using conventional extruding devices well known in the art and commercially available. The polyurethanes are preferably extruded at a temperature of, for example, from about 215° C. to about 310° C. (about 420° F. to about 590° F.), more preferably from about 235° C. to about 260° C. (about 455° F. to about 500° F.). Typical pressure conditions of extrusion through a melt flow indexer are, for example, a load of about 6 to about 20 kg (corresponding to about 2,475 to about 8,249 psi of pressure), more preferrably a load of about 8 to about 13 kg (corresponding to about 3,299 to about 5,362 psi of pressure). The polyurethanes may preferably be extruded into, for example, inflatable tubular structures or bladders for air bags.

Following extrusion, the polyurethanes will set to full stabilization and maximum cure properties in approximately 3 to 21 days under ambient conditions. Preferably, post-extrusion curing is effected by subjecting the extruded products to an elevated temperature in order to accelerate the stabilizing and curing process. For example, the extruded products may be subjected to a temperature of about 70° C. to 165° C. (about 160° F. to 325° F.), more preferrably about 95° C. to 110° C. (about 200° F. to 230° F.), for a period of about 4 to 24 hours, more preferrably about 12 to 16 hours.

The process of the present invention is illustrated by the following examples.

EXAMPLE 1

A clean reactor equipped with heating, cooling, vacuum, dry $N_2$, and an agitator is charged with Desmodur W (4,4'-dicyclohexylmethane diisocyanate containing 20% of the trans, trans isomer). The agitator is turned on. The temperature of the Desmodur W is increased to 71° C.

A mixture of diethylene glycol-initiated polycaprolactones, Tone 0240 (equivalent weight 1,000) and Tone 0230 (equivalent weight 625) both available from Union Carbide, is prepared. A sufficient amount of the Tone 0230 is added to the Tone 0240 such that when melted and mixed at 80° C., an equivalent weight of about 950 is achieved.

The polycaprolactone mixture is then added to the Desmodur W in an equivalent ratio of two NCO groups to one OH group. Heat and vacuum are turned on. When the temperature reaches approximately 100° C., the heat is turned off, and the reaction is allowed to exotherm to 110 to 121° C. When the reaction is completed and the temperature decreases to approximately 77° C., the resulting prepolymer is discharged from the reactor and filtered through a 200 mesh filter into clean containers. The containers are then purged with dry $N_2$ and sealed.

The prepolymer is then reacted with Ethacure 100 as the diamine curing agent in an equivalent ratio of 0.99 $NH_2$ groups to 1.0 NCO groups. With the prepolymer at a temperature of approximately 71° C., the Ethacure 100 at room temperature is added, and the components are thoroughly mixed. The mixture is then evacuated at 250 to 1,000 millitorr until it is bubble-free or only a few bubbles are breaking on the surface. The evacuated mixture is then cast into molds and cured for 8 to 16 hours at 105° C. The cast sheets were then granulated and pelletized to form extrudable thermoplastic elastomer pellets.

It is believed that the resulting elastomer has the following idealized formula:

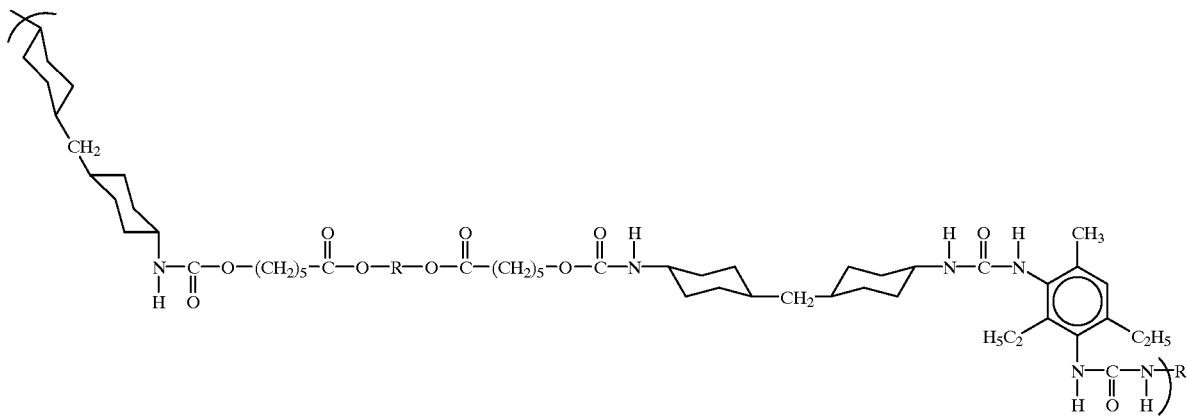

This formula shows the polycaprolactone/Desmodur W prepolymer with one of its NCO groups reacted with the NH₂ group from the Ethacure 100 diamine curing agent.

Table 1 shows a comparison of the rheological properties of (1) Pellethane 2102-80A, an extrudable grade hydroxyl-extended caprolactone polyester urethane commercially available from Dow with (2) the urea-extended urethane polymer resulting from the process of the present invention.

TABLE 1

|  | Pellethane 2102-80A | Present Invention |
|---|---|---|
| Melt Flow Rate (MFR) D1238 | 190° C./8.7 kg/5.0 g/ 10 min | 230° C./8.7 kg/5.38 g/ 10 min |

As can be seen from Table 1, the rheological properties of the polymer resulting from the process of the present invention are superior to those of the prior art polyurethane composition.

EXAMPLE 2

The physical properties of a sample of the cast polymer sheet resulting from Example 1 are determined and are set forth in Table 2. The cast sheet is approximately 70–75 mils thick.

The urethane polymer pellets resulting from Example 1 are melted and extruded to form inflatable tubular structures (ITS) which are then post-cured after extrusion. Post-cure time/temperature profiles evaluated are 2 and 4 hours at 110° C., 1.5 hours at 132° C., and 1 and 2 hours at 150° C. The physical properties of the extruded samples are then determined. Post-cured samples give very similar results. Sample thickness of the extruded material ranges from 22 to 28 mils. The physical properties of a representative sample of the post-cured extruded polymer are set forth in Table 2, which shows a comparison of the physical properties of Pellethane 2102-80A with the physical properties of the cast and extruded samples resulting from the process of the present invention.

TABLE 2

| Property | | Pellethane 2102-80A | Invention Cast ITS-6 | Invention Extruded ITS-6 |
|---|---|---|---|---|
| Tensile strength, psi | D412 | 5,800 | 7,500 | 8,400 |
| Elongation, pct | D412 | 500 | 600 | 600 |
| Tensile modulus, 100% elongation, psi | D412 | 800 | 587 | 528 |
| Tensile modulus, 200% elongation, psi | D412 | — | 853 | 752 |
| Tensile modulus, 300% elongation, psi | D412 | 1,800 | 1,333 | 1,334 |
| Tear strength, Die C, pli | D624 | 600 | 490 | 430 |
| Tear strength, trouser split, pli | D1938 | — | 320 | 250 |
| Elongation Set, pct | D412 | 50 | 16 | 30 |
| Durometer hardness, A scale | D2240 | 81 | 83 | 80 |

In Table 2, psi represents pounds per square inch; and pli represents pounds per linear inch.

As can be seen from Table 2, the physical properties of the composition resulting from the process of the present invention are superior to those of the prior art polyurethane composition. In addition, while the Pellethane 2102-80A is formulated for extrusion only, the polyurethane resulting from the process of the present invention can be liquid-cast, injection-molded, transfer-molded, sprayed, and/or extruded without changing its chemistry or stoichiometry.

EXAMPLE 3

Additional samples of the urethane polymer are prepared by the process of the invention using additional E-caprolactone polyesters in order to evaluate the physical properties and processing parameters of the resulting polymers. The E-caprolactone polyesters are esterified using 1,6-hexanediol and neopentyl glycol as initiators. These E-caprolactone polyesters are available from Solvay Interox of the UK. The E-caprolactone polyesters that are used in this example are as follows: CAPA 162/034 and CAPA 306/001 are 1,6-hexanediol-initiated polycaprolactones; CAPA 216 and CAPA 225 are neopentyl glycol-initiated polycaprolactones.

In addition, the effect of increasing the trans, trans ratio of the diisocyanate on the properties of the cured elastomer is evaluated. The diisocyanate used for this evaluation is XP-7041E, which contains 50% of the trans, trans isomer of 4,4'-dicyclohexylmethane diisocyanate.

The same process as Example 1 is used to prepare the prepolymers, except that the XP-7041E is melted at 80° C. and thoroughly mixed prior to use. The respective E-caprolactone polyesters are melted at 80° C. and then blended to give an equivalent weight of 950 prior to reacting with the diisocyanate to form the prepolymer. The E-caprolactone polyesters are added to the diisocyanate (XP-7041E) in an equivalent ratio of two NCO groups to one OH group. While this process substantially duplicates the prepolymer preparation process in Example 1, it provides a better understanding of the effect on physical, thermal, and processing properties related to changing initiators in the esterification of E-caprolactone and increasing the trans, trans ratio of the diisocyanate.

The curing agents used in this example are diethylene toluenediamine (DETDA) (samples ITS-7 to ITS-10) and a 95:5 equivalent mixture of DETDA and M-DIPA (sample ITS-10G-1). The ratio of $NH_2$ groups to NCO groups is maintained at 1:1.

Samples are mixed, evacuated, cast, and cured as in Example 1. The physical properties of the resulting cured elastomer samples are then determined. The results are set forth in Table 3.

TABLE 4

| Property | ITS-6 Cast | ITS-6 Extruded | ITS-7 | ITS-8 | ITS-9 | ITS-10 |
|---|---|---|---|---|---|---|
| Tensile strength, psi | 7,800 | 8,320 | 8,120 | 8,383 | 7,845 | 7,771 |
| Elongation, pct | 550 | 550 | 500 | 500 | 500 | 500 |
| Tensile modulus, 100% elongation, psi | 628 | 528 | 706 | 657 | 684 | 629 |
| Tensile modulus, 200% elongation, psi | 889 | 800 | 1,059 | 1,015 | 1,043 | 971 |
| Tensile modulus, 200% elongation, psi | 1,556 | 1,440 | 1,765 | 1,612 | 1,635 | 1,571 |
| Die C tear, pli | 410 | 352 | 382 | 425 | 422 | 400 |
| Trouser tear, pli | 125 | 178 | 125 | 203 | 222 | 191 |
| Tensile set, pct | 13 | 28 | 13 | 13 | 13 | 9 |
| Hardness, A scale | 84 | — | 87 | 84 | 86 | 84 |

As shown in Table 4, all of the samples that are evaluated show good retention of physical properties with no blocking of the cast or extruded bladder material after heat-aging at 110° C. for 410 hours.

EXAMPLE 5

Additional polyurethane samples are prepared according to the process of Example 1 using neopentyl glycol-initiated

TABLE 3

| Property | ITS-7<br>Tone 0240<br>Tone 0230<br>XP-7041E<br>DETDA | ITS-8<br>CAPA 162/034<br>CAPA 306/001<br>Desmodur W<br>DETDA | ITS-9<br>CAPA 162/034<br>CAPA 306/001<br>XP-7041<br>DETDA | ITS-10<br>CAPA 225<br>CAPA 216<br>Desmodur W<br>DETDA | ITS-10G-1<br>CAPA 225<br>CAPA 216<br>Desmodur W<br>DETDA/M-DIPA |
|---|---|---|---|---|---|
| Tensile strength, psi | 7,354 | 8,523 | 8,803 | 7,622 | 7,702 |
| Elongation, pct | 605 | 600 | 615 | 600 | 600 |
| Tensile modulus, 100% elongation, psi | 656 | 609 | 625 | 563 | 541 |
| Tensile modulus, 200% elongation, psi | 944 | 985 | 935 | 845 | 793 |
| Tensile modulus, 300% elongation, psi | 1,528 | 1,385 | 1,485 | 1,239 | 1,183 |
| Tear strength, Die C, pli | 448 | 475 | 525 | 455 | 430 |
| Tear strength, trouser split, pli | 382 | 305 | 325 | 310 | 297 |
| Tensile set after break, % | 19 | 16 | 18 | 10 | 12 |
| Durometer Hardness, A scale | 85 | 83 | 84 | 81 | 81 |

The physical properties of the systems documented in Table 3 are excellent. The thermal resistance of the samples that are prepared using XP-7041E, which contains 50 percent of the trans, trans isomer, is superior to that of the samples prepared using Desmodur W, which contains only 20 percent of the trans, trans isomer of 4,4'-dicyclohexylmethane diisocyanate.

EXAMPLE 4

The thermal stability and blocking characteristics of the samples resulting from Examples 2 and 3 are determined by heat aging in a Blue M forced-air circulating oven for 410 hours at 110° C.

The blocking evaluation consists of placing samples of the cast or extruded bladder material into the oven both with and without weight being applied. The weight is placed across the center of the sample, and in the case of the extruded samples, parallel to extrusion. The force applied is approximately 2.0 psi. After 410 hours, all samples are removed from the oven, allowed to cool to room temperature, and the bladder material is evaluated for blocking. No blocking of any of the samples occurs during the 410 hour/110° C. thermal aging test.

Table 4 shows the physical properties of the heat-aged samples:

polycaprolactones (CAPA 216 and CAPA 225) as the hydroxy-containing intermediate and Desmodur W as the aliphatic diisocyanate.

The diamine curing agents used in this example are diethylene toluene diamine (DETDA) (sample 10G) and a 70:30 equivalent mixture of DETDA and M-DIPA (sample 10G-3). The diamine curing agent is added to the prepolymer in an equivalent ratio of 1.02 $NH_2$ groups to 1.0 NCO group or 1.06 $NH_2$ groups to 1.0 NCO group (see Table 5). The cured polymer is cast into a sheet 72 mils thick. The cast sheets are then post-cured for 16 hours at 105° C. followed by aging for 7 days at room temperature. One set of samples is then further exposed to thermal aging for 30 days at 105° C. Another set of samples is then further exposed to hydrolytic aging for 30 days in distilled water at 71° C. The physical properties of the cast sheets are set forth in Table 5.

TABLE 5

| PROPERTY | S | T | H | S | T | H |
|---|---|---|---|---|---|---|
| | ITS-10G<br>1.0 NCO/1.02 $NH_2$ | | | ITS-10G<br>1.0 NCO/1.06 $NH_2$ | | |
| Tensile Strength, psi | 7,583 | 7,111 | 7,557 | 6,265 | 6,101 | 6,577 |

TABLE 5-continued

| PROPERTY | S | T | H | S | T | H |
|---|---|---|---|---|---|---|
| Elongation, % | 550 | 520 | 560 | 563 | 525 | 650 |
| Tensile modulus, 100% elongation, psi | 634 | 679 | 634 | 586 | 684 | 588 |
| Tensile modulus, 200% elongation, psi | 894 | 997 | 889 | 856 | 1,019 | 829 |
| Tensile modulus, 300% elongation, psi | 1,453 | 1,648 | 1,389 | 1,257 | 1,580 | 1,221 |
| Trouser Tear, pli | | 202 | | | 286 | |
| Elongation Set, % | 11 | 11 | 11 | 13 | 9 | 17 |
| A Hardness | 83 | 84 | 83 | 82 | 84 | 82 |
| | ITS-10G-3 1.0 NCO/1.02 $NH_2$ | | | ITS-10G-3 1.0 NCO/1.06 $NH_2$ | | |
| Tensile Strength, psi | 6,523 | 6,010 | 6,248 | 6,188 | 5,644 | 5,136 |
| Elongation, % | 525 | 480 | 587 | 600 | 495 | 650 |
| Tensile modulus, 100% elongation, psi | 573 | 638 | 515 | 562 | 648 | 504 |
| Tensile modulus, 200% elongation, psi | 866 | 983 | 780 | 833 | 947 | 724 |
| Tensile modulus, 300% elongation, psi | 1,368 | 1,606 | 1,208 | 1,235 | 1,566 | 1,048 |
| Trouser Tear, pli | | 214 | | | 236 | |
| Elongation Set, % | 9 | 6 | 11 | 13 | 9 | 16 |
| A Hardness | 81 | 84 | 79 | 81 | 84 | 78 |

In Table 5, "S" refers to the standard unaged samples; "T" refers to the thermal aged samples; and "H" refers to the hydrolytic aged samples.

EXAMPLE 6

A further polyurethane sample is prepared in the same manner as Example 5, except that the diamine curing agent used in this example is a 70:30 equivalent mixture of DETDA and M-DIPA, and the diamine curing agent is added to the prepolymer in an equivalent ratio of 0.98 $NH_2$ groups to 1.0 NCO group. Further, one sample is prepared without the addition of any antiblocking agents/extrusion processing aids, while to another sample 0.25 wt. % Acrawax C ("Wax") and 2.0 wt. % flux-calcined diatomaceous earth ("Floss") is added. The cast polyurethane sheet is extruded to form a sheet 21 to 25 mils thick. The post-cured extruded sheet is exposed to hydrolytic aging for 43 days in distilled water at 71° C. The physical properties of the hydrolytic-aged samples are set forth in Table 6.

TABLE 6

| PROPERTY | ITS-10G-3 NO WAX NO FLOSS | ITS-10G-3 0.25% WAX 2.0% FLOSS |
|---|---|---|
| Tensile Strength, psi | 6,373 | 6,385 |
| Elongation, % | 575 | 600 |
| Tensile modulus, 100% elongation, psi | 531 | 548 |
| Tensile modulus, 200% elongation, psi | 807 | 807 |
| Tensile modulus, 300% elongation, psi | 1,289 | 1,290 |
| Elongation Set, % | 22 | 28 |

EXAMPLE 7

An additional polyurethane sample is prepared according to the process of Example 1, using polytetramethylene ether glycol (PTMEG) having a weight average molecular weight of 1000 as the hydroxy-containing intermediate. The PTMEG is added to the Desmodur W in an equivalent ratio of 1.45–1.65 NCO groups to 1.0 OH group. The prepolymer is reacted with a 70:30 equivalent mixture of DETDA and M-DIPA as the diamine curing agent, which is added to the prepolymer in an equivalent ratio of 0.98–1.0 $NH_2$ groups to 1.0 NCO groups. The cured polymer is cast into a sheet 72 mils thick. The resulting polyurethane has excellent extrusion parameters and a Shore "A" hardness of 75. The physical properties of the cast sheet are set forth in Table 7.

TABLE 7

| PROPERTY | STANDARD | 71° C. WATER IMERSION (DAYS) | | | 105° C. THERMAL AGING (DAYS) | |
|---|---|---|---|---|---|---|
| | | 23 | 43 | 63 | 15 | 60 |
| Tensile, psi | 5,136 | 5,463 | 5,273 | 5,602 | | 4,512 |
| Elongation, % | 450 | 490 | 450 | 465 | | 420 |
| Tensile modulus, 100% elongation, psi | 470 | 418 | 418 | 424 | | 522 |
| Tensile modulus, 200% elongation, psi | 714 | 657 | 657 | 667 | | 870 |
| Tensile modulus, 300% elongation, psi | 1,286 | 1,224 | 1,194 | 1,197 | | 1,583 |
| Elongation Set, % | 3 | 5 | 0.8 | 3 | | 5 |
| Hardness, A Scale | 76 | 75 | 74 | 76 | | 76 |

EXAMPLE 8

Example 7 is repeated using polytetramethylene ether glycol (PTMEG) having a weight average molecular weight of 2000 as the hydroxy-containing intermediate, which is reacted with Desmodur W in an equivalent ratio of 2.0 NCO groups to 1.0 OH group. The physical properties of a 72 mils thick cast sheet are set forth in Table 8.

TABLE 8

| PROPERTY | STAND-ARD | 71° C. WATER IMERSION (DAYS) | | | 105° C. THERMAL AGING (DAYS) | | |
|---|---|---|---|---|---|---|---|
| | | 23 | 43 | 63 | 15 | 30 | 60 |
| Tensile, psi | 5,099 | 5,275 | 4,538 | 5,294 | 5,020 | 4,386 | 3,716 |
| Elongation, % | 500 | 508 | 505 | 530 | 475 | 450 | 520 |
| Tensile modulus, 100% elongation, psi | 620 | 638 | 592 | 620 | 640 | 657 | 482 |
| Tensile modulus, 200% elongation, psi | 958 | 928 | 896 | 887 | 1,000 | 1,034 | 901 |
| Tensile modulus, 300% elongation, psi | 1,549 | 1,507 | 1,408 | 1,414 | 1,743 | 1,743 | 1,373 |
| Elongation Set, % | 13 | 13 | 9 | 14 | 6 | 14 | 22 |
| Hardness, A Scale | 85 | 85 | 82 | 83 | 84 | 86 | 83 |

EXAMPLE 9

The ASTM D-1238 method for measuring the melt flow index is modified to reduce the dwell time. The following procedure is used to measure the melt flow index of the polyurethanes of the present invention. A temperature of 220° C. to 250° C. and a load of 7.0 kg to 12.5 kg is used depending on the composition of the polyurethane. A five gram sample of the polyurethane elastomer is charged to the melt flow indexer. A 30 second time frame is used to pack the pellets or granulated elastomer, after which time an additional dwell time of 150 seconds is used (for a total of 3 minutes) before applying the weight. The total five gram charge is extrudable for evaluation. Evaluation consists of appearance, diameter change from start to finish, time to extrude and strength by pulling on the extruded ribbon.

In general, evaluation in accordance with this method of samples prepared in accordance with the present invention has shown that the first portion of the extrusion is very strong, while the last portion is weak. However, after 24 hours there is a significant increase in the strength of the last portion, and after 7 to 14 days, all properties have fully recovered so that the strength of the extrusion is the same from front to end.

EXAMPLE 10

It has been discovered that when the hydroxy-containing intermediate is a polyether glycol and the ratio of equivalents is reduced to below two NCO groups to one OH group, the polyurethanes produced unexpectedly exhibit significantly better than expected hydrolytic and thermal stability. As examples of this phenomenon, three prepolymer samples using PTMEG as the hydroxy-containing intermediate are prepared according to the process of Example 1.

In the first sample ("sample 10A"), a prepolymer having an equivalent weight ratio of 1.62 NCO to 1.0 OH is prepared by first melting out, if necessary, PTMEG 1000 (e.g., PTMEG having a weight average molecular weight of 1000) in the range of about 50° C. to 71° C. The melted PTMEG is charged to a reactor which has been previously charged with Desmodur W. While in the reactor, the mixture is agitated, maintained in a moisture-free environment, for example, by subjecting the mixture to a dry nitrogen purge, heated to within the range of about 100° C. to about 138° C. and reacted until the theoretical equivalent weight has been reached. The reaction time will be longer at the lower temperature and shorter at the higher temperature.

After the reaction is completed (completion of reaction can be verified by an equivalent weight determination), UV stabilizers and antioxidants can be added in the range of about 100° C. to about 127° C. The solution should be mixed until all the additives have gone into solution. Thus, for example, 0.4% by weight of Irganox 1010, an antioxidant available from Ciba-Geigy, can be added to the prepolymer. If the materials are to be used where UV stability is a problem, UV stabilizers such as Tinuvin 368 and Tinuvin 765, both available from Ciba-Giegy, can also be added at the prepolymer stage.

After the additives have gone into solution (or after completion of the reaction if additives are not used), the reactants are cooled in the range of about 70° C. to about 85° C., evacuated, dumped, purged with dry nitrogen and sealed. The product is stored at room temperature for approximately 24 hours and the equivalent weight of the system is verified.

In the second sample ("sample 10B"), another prepolymer having an equivalent weight ratio of 1.62 NCO to 1.0 OH is prepared as described above for sample 10A except that the hydroxy-containing intermediate is a mixture of 0.9 equivalents of PTMEG 1000 and 0.1 equivalents of PTMEG 2000.

In the third sample ("sample 10C"), a prepolymer is prepared having an equivalent weight ratio of 1.85 equivalents NCO to 1.0 equivalents of OH. The prepolymer is prepared in the same manner as sample 10A except that the hydroxy-containing intermediate is a mixture of 0.20 equivalents of PTMEG 1000 and 0.80 equivalents of PTMEG 2900.

In each of the above cases, the prepolymer formed is then cured by addition of the diamine curing agent, DETDA. DEDTA is added to the prepolymer in an equivalent ratio of 0.85 to 1.06 $NH_2$ groups to 1.0 NCO groups. In a preferred embodiment, 0.85–1.0 equivalents of DETDA is added to 1.0 equivalents of the prepolymer. In a preferred embodiment, 0.85 to 1.0 equivalents of DETDA is added to 1.0 equivalents of the prepolymer. In the most preferred embodiment, 0.95 to 0.97 equivalents of DETDA is added to 1.0 equivalents of the prepolymer.

As in Example 1, the polyurethane samples are cast into sheets about 72 mils thick. The cast sheets are then cured for 16 hours at 105° C. followed by aging for 7 days at room temperature. Table 10 sets forth the physical properties of the cast sheets and shows a comparison with the properties of a standard commercial elastomer, Dow 2103-85 elastomer.

A set of polyurethane samples is also evaluated after thermal aging for 30 days at 105° C. Another set of samples is evaluated after being exposed to hydrolytic aging by immersion in distilled water for 30 days at 80° C. Results of the thermal and hydrolytic aging evulation experiments are also set forth in Table 9.

Physical properties were determined in accordance with ASTM standards, as indicated in the table, except for melt flow which was measured in accordance with ASTM D-1238 modified to reduce dwell time as described in Example 9.

TABLE 9

ELASTOMERIC PROPERTY COMPARISON

| Property | ASTM test | Dow Pellethane 2103-85 | 10A | 10C | 10B |
|---|---|---|---|---|---|
| Tensile strength, psi | D-412 | 7,143 | 7,961 | 6,980 | 7,618 |
| Elongation, % | D-412 | 508 | 500 | 615 | 565 |
| Modulus, psi: | D-412 | | | | |
| 100% | | | 1,032 | 754 | 424 | 571 |
| 200% | | | 1,543 | 1,261 | 588 | 912 |
| 300% | | | 2,305 | 2,116 | 882 | 1,529 |
| Trouser split tear, lb-f/in | D-1938 | 190 | 190 | 121 | 110 |
| Elongation set, % | D-412 | 16 | 16 | 9 | 16 |
| Shore A hardness | D-2240 | 83 | 84 | 72 | 81 |
| TMA softening, degree C. | | | 205.4 | 208.1 | 205 |
| DMA Tg, degree C. | | −58 | −54 | −80 | −59 |
| Taber abrasion, H-18 wheel | | | 31 | | 21 |
| melt flow, 241° C./ 8.7 kg, g/min | D-1238 | liquid | 1.2 at 246° C. | 4.9 at 241° C. | 1.16 at 241° C. |
| Bashore rebound, % | | | 39 | 68 | 43 |
| Microbial resistance | | non nutrient | non nutrient | non nutrient | non nutrient |
| Compression set, method B | D-395 | | | | |
| 22 hours at 71° C.: | | | | | |
| 95% theory | | | 45 | 26 | 37 |
| 98% theory | | 80 | | | |
| 100% theory | | | 60 | 44 | 59 |
| 30 day/80° C. distilled water | | | | | |
| Tensile strength, psi | D-412 | 5,853 | 8,019 | 7,117 | 7,877 |
| Elongation, % | D-412 | 643 | 504 | 660 | 579 |
| Modulus, psi: | D-412 | | | | |
| 100% | | | 926 | 754 | 428 | 569 |
| 200% | | | 1,366 | 1,217 | 592 | 887 |
| 300% | | | 1,853 | 2,139 | 832 | 1,549 |
| Elongation set, % | D-412 | 38 | 18 | 9 | 21 |
| Shore A Hardness | D-2240 | 80 | 84 | 73 | 80 |
| 30 day/105° C. | | | | | |

TABLE 9-continued

ELASTOMERIC PROPERTY COMPARISON

| Property | ASTM test | Dow Pellethane 2103-85 | 10A | 10C | 10B |
|---|---|---|---|---|---|
| heat aging | | | | | |
| Tensile strength, psi | D-412 | 3,492 | 8,333 | 7,420 | 8,157 |
| Elongation, % | D-412 | 678 | 475 | 650 | 507 |
| Modulus, psi: | D-412 | | | | |
| 100% | | 937 | 777 | 464 | 657 |
| 200% | | 1,317 | 1,288 | 620 | 1,056 |
| 300% | | 1,651 | 2,283 | 870 | 1,790 |
| Elongation set, % | D-412 | 94 | 12 | 8 | 9 |
| Shore A hardness | D-2240 | 81 | 85 | 73 | 81 |

EXAMPLE 11

The ability of polyurethane sample 10C, from Example 10, to resist thermal and hydrolytic decay was demonstrated by a series of tests. In one test, samples were immersed into 80° C. distilled water for 30 days, removed, and immediately placed into a 105° C. oven. A second set of samples was aged for 30 days at 105° C., removed from the oven and immediately immersed into distilled water which was 80° C. The heat aged samples, followed by immersion, were tested twice: immediately after removal from the 80° C. water, and after drying for 7 days at 25° C. Such accelerated testing gives insight into how a material performs to meet end-product requirements, when exposed to different environmental parameters.

Table 10 sets forth the results of this testing. The performance of sample 10C was better than expected, especially the retention of tensile strength when tested wet. This is an important result because in actual use the elastomer could well be exposed to high humidity and/or high temperature/high humidity conditions.

TABLE 10

| Properties | Dow S | Dow H to T | Dow T to H Wet | Dow T to H Dry | Example 10c S | Example 10c H to T | Example 10c T to H Wet | Example 10c T to H Dry |
|---|---|---|---|---|---|---|---|---|
| Tensile strength, psi | 6,534 | 1,532 | 1,611 | 2,326 | 6,957 | 7,198 | 6,275 | 7,435 |
| Elongation, % | 533 | 801 | 770 | 750 | 650 | 672 | 760 | 700 |
| Modulus, psi: | | | | | | | | |
| 100% | 943 | 789 | 667 | 840 | 417 | 452 | 363 | 400 |
| 200% | 1,434 | 861 | 889 | 1,097 | 580 | 582 | 485 | 566 |
| 300% | 2,057 | 1,012 | 1,044 | 1,343 | 823 | 863 | 667 | 800 |
| Elongation set, % | 22 | 175 | 165 | 150 | 8 | 11 | 14 | 16 |
| Hardness, Shore A scale | 84 | 76 | 69 | 77 | 73 | 73 | 70 | 73 |
| Tensile strength, psi % change | | −77 | −75 | −64 | | +3.5 | −9.8 | +6.9 |

In Table 10, "S" refers to standard; "H to T" refers to water immersion to thermal aging; "T to H" refers to thermal aging to water immersion.

The foregoing disclosure of embodiments of the invention has been presented for the purposes of illustration and description. It is not intended to be exhaustive or to limit the invention to the precise form disclosed. Variations and modifications of the embodiments described herein will be obvious to one of ordinary skill in the art. The scope of the invention is to be defined only by the claims appended hereto.

What is claimed is:

1. An extrudable thermoplastic elastomeric urea-extended polyurethane comprising the reaction product of:
   (a) a polyurethane prepolymer comprising the reaction product of at least one aliphatic diisocyanate with at least one hydroxy-containing intermediate wherein the at least one aliphatic diisocyanate is 4,4'-dicyclohexylmethane diisocyanate and the at least one hydroxy-containing intermediate is a polyether glycol having a weight average molecular weight of about 650 to about 3000; and
   (b) at least one diamine curing agent selected from the group consisting of 2,4-diamino-3,5-diethyl-toluene, 2,6-diamino-3,5-diethyl-toluene, 4,4'-methylene-bis(2,6-diisopropylaniline), trimethylene glycol di-para aminobenzoate, and mixtures thereof;
   wherein said polyurethane has a Shore A hardness of 72 to 84, a DMA $T_g$ of −80° C. or less, and a TMA softening point of 205° C. to 208° C., and wherein said polyurethane is thermally and hydrolytically stable and resistant to microbial decay.

2. The polyurethane according to claim 1, wherein said at least one hydroxy-containing intermediate is polytetramethylene ether glycol having a weight average molecular weight of about 650 to about 3000.

3. The polyurethane according to claim 2, wherein about 1.6 equivalents of said 4,4'-dicyclohexylmethane diisocyanate is reacted with about 1.0 equivalent of said polytetramethylene ether glycol.

4. The polyurethane according to claim 2, wherein a 72 mil thick sample sheet retains at least 100% of its tensile strength after being subjected to hydrolytic aging by immersion in distilled water at 80° C. for 30 days followed by drying in air for 7 days at 25° C.

5. The polyurethane according to claim 2, wherein a 72 mil thick sample sheet retains at least 100% of its tensile strength after being subjected to thermal aging by exposure to air at 105° C. for 30 days followed by cooling to room temperature.

6. The polyurethane according to claim 2, wherein a 72 mil thick sample sheet retains at least 100% of its tensile strength after being subjected to hydrolytic aging by immersion in distilled water at 80° C. for 30 days followed by thermal aging by exposure to air at 105° C. and then cooling to room temperature.

7. The polyurethane according to claim 2, wherein a 72 mil thick sample sheet retains at least 100% of its tensile strength after being subjected to thermal aging by exposure to air at 105° C. for 30 days followed by hydrolytic aging by immersion in distilled water at 80° C. and drying in air for 7 days at 25° C.

8. The polyurethane according to claim 1, wherein said at least one hydroxy-containing intermediate is mixture of polytetramethylene ether glycol having a weight average molecular weight of about 1000 and polytetramethylene ether glycol having a weight average molecular weight of about 2000.

9. The polyurethane according to claim 8, wherein about 1.6 equivalents of said 4,4'-dicyclohexylmethane diisocyanate is reacted with about 0.9 equivalents of said polytetramethylene ether glycol having a weight average molecular weight of about 1000 and about 0.1 equivalents of said polytetramethylene ether glycol having a weight average molecular weight of about 2000.

10. The polyurethane according to claim 1, wherein said at least one hydroxy-containing intermediate is mixture of polytetramethylene ether glycol having a weight average molecular weight of about 1000 and polytetramethylene ether glycol having a weight average molecular weight of about 2900.

11. The polyurethane according to claim 10, wherein about 1.8 equivalents of said is 4,4'-dicyclohexylmethane diisocyanate is reacted with about 0.2 equivalents of said polytetramethylene ether glycol having a weight average molecular weight of about 1000 and about 0.8 equivalents of said polytetramethylene ether glycol having a weight average molecular weight of about 2900.

12. A process for forming a product, comprising:
(a) heating a thermoplastic elastomeric urea-extended polyurethane comprising the reaction product of at least one aliphatic diisocyanate, at least one hydroxy-containing intermediate, and at least one diamine curing agent, wherein said at least one aliphatic diisocyanate is 4,4'-dicyclohexylmethane diisocyanate and said at least one hydroxy-containing intermediate is a polyether glycol having a weight average molecular weight of about 650 to about 3000; and
(b) extruding the heated polyurethane to form an extruded product, wherein said product has a Shore A hardness of 72 to 84, a DMA $T_g$ of $-80°$ C. or less, and a TMA softening point of 205° C. to 208° C., and wherein said product is thermally and hydrolytically stable and resistant to microbial decay.

13. A process according to claim 12, wherein said at least one polyether glycol is polytetramethylene ether glycol having a weight average molecular weight of 1000, and wherein about 1.6 equivalents of said 4,4'-dicyclohexylmethane diisocyanate is reacted with about 1.0 equivalent of said polytetramethylethylene ether glycol 1000.

14. The process according to claim 12, wherein said at least one hydroxy-containing intermediate is mixture of polytetramethylene ether glycol having a weight average molecular weight of about 1000 and polytetramethylene ether glycol having a weight average molecular weight of about 2000, and wherein about 1.6 equivalents of said 4,4'-dicyclohexylmethane diisocyanate is reacted with about 0.9 equivalents of said polytetramethylene ether glycol having a weight average molecular weight of about 1000 and about 0.1 equivalent of said polytetramethylene ether glycol having a weight average molecular weight of about 2000.

15. The process according to claim 12, wherein said at least one hydroxy-containing intermediate is mixture of polytetramethylene ether glycol having a weight average molecular weight of about 1000 and polytetramethylene ether glycol having a weight average molecular weight of about 2900, and wherein about 1.8 equivalents of said 4,4'-dicyclohexylmethane diisocyanate is reacted with about 0.2 equivalents of said polytetramethylene ether glycol having a weight average molecular weight of about 1000 and about 0.8 equivalents of said polytetramethylene ether glycol having a weight average molecular weight of about 2900.

* * * * *

UNITED STATES PATENT AND TRADEMARK OFFICE
CERTIFICATE OF CORRECTION

PATENT NO.    : 6,258,917 B1
DATED         : July 10, 2001
INVENTOR(S)   : Slagel It is certified that error appears in the above-identified patent and that said Letters Patent is hereby corrected as shown below:

Column 5,
Line 63, "dicyclohexyl-methane" should read -- dicyclohexylmethane --
Line 65, "dicyclohexyl-methane" should read -- dicyclohexylmethane --

Column 6,
Line 2, "dicycclohexyl-methane" should read -- dicyclohexylmethane --

Column 16,
Lines 6-8, delete "In a preferred embodiment, 0.85 to 1.0 equivalents of DETDA is added to 1.0 equivalents of the prepolymer"

Signed and Sealed this

Twenty-third Day of April, 2002

Attest:

Attesting Officer

JAMES E. ROGAN
Director of the United States Patent and Trademark Office